United States Patent
Danks et al.

(10) Patent No.: US 9,050,682 B2
(45) Date of Patent: Jun. 9, 2015

(54) ELECTROSLAG WELDING WITH ALTERNATING ELECTRODE WELD PARAMETERS

(76) Inventors: Daniel R. Danks, Portland, OR (US); Robert B. Turpin, Cornelius, OR (US)

( * ) Notice: Subject to any disclaimer, the term of this patent is extended or adjusted under 35 U.S.C. 154(b) by 922 days.

(21) Appl. No.: 12/947,661

(22) Filed: Nov. 16, 2010

(65) Prior Publication Data

US 2012/0118859 A1    May 17, 2012

(51) Int. Cl.
   *B23K 25/00*    (2006.01)
(52) U.S. Cl.
   CPC ........................ *B23K 25/00* (2013.01)
(58) Field of Classification Search
   CPC ............................................. B23K 25/00
   USPC ........ 219/73.1, 73.11, 73.21, 73.2, 74, 137.7, 219/137 R
   See application file for complete search history.

(56) References Cited

U.S. PATENT DOCUMENTS

| | | | |
|---|---|---|---|
| 3,192,356 A | 6/1965 | Shrubsall | |
| 3,211,887 A | 10/1965 | Cotterman | |
| 3,291,955 A | 12/1966 | Shrubsall et al. | |
| 3,337,712 A | 8/1967 | Lucey | |
| 3,975,614 A * | 8/1976 | Toth et al. | 219/126 |
| 4,104,504 A | 8/1978 | Ridenour | |
| 4,151,389 A * | 4/1979 | Hirsch et al. | 219/73.1 |
| 4,208,564 A | 6/1980 | Wada et al. | |
| 4,413,169 A | 11/1983 | Cameron | |
| 4,429,207 A | 1/1984 | Devletian | |
| 4,841,116 A | 6/1989 | Kimura et al. | |
| 6,166,347 A | 12/2000 | Morlock | |
| 6,207,920 B1 | 3/2001 | Morlock | |
| 6,940,039 B2 * | 9/2005 | Blankenship et al. | 219/130.01 |
| 7,041,936 B2 | 5/2006 | Oberzaucher et al. | |
| 2008/0061039 A1* | 3/2008 | Danks et al. | 219/73.1 |
| 2010/0230394 A1* | 9/2010 | Yokota et al. | 219/130.51 |
| 2010/0308019 A1 | 12/2010 | Bong | |
| 2010/0310412 A1 | 12/2010 | Kloewer et al. | |
| 2012/0055911 A1* | 3/2012 | Jia et al. | 219/137.44 |

* cited by examiner

*Primary Examiner* — Dana Ross
*Assistant Examiner* — James Sims, III

(57) ABSTRACT

Technologies related to electroslag welding are generally disclosed.

12 Claims, 9 Drawing Sheets

ELECTROSLAG WELDING WITH ALTERNATING ELECTRODE WELD PARAMETERS

BACKGROUND

Electroslag welding is a single pass welding process that may be used to join two or more work pieces at a weld location. In general, electroslag welding may include electrical resistance heating, using electrodes, a molten slag pool positioned between the work pieces, cooling shoes and a base plate. As the weld progresses, the electrodes may be fed into the molten slag pool which may fill the void between the work pieces, and cool to form the weld. The cooling shoes and base plate may be removed and excess weld material may be removed to complete the weld process.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
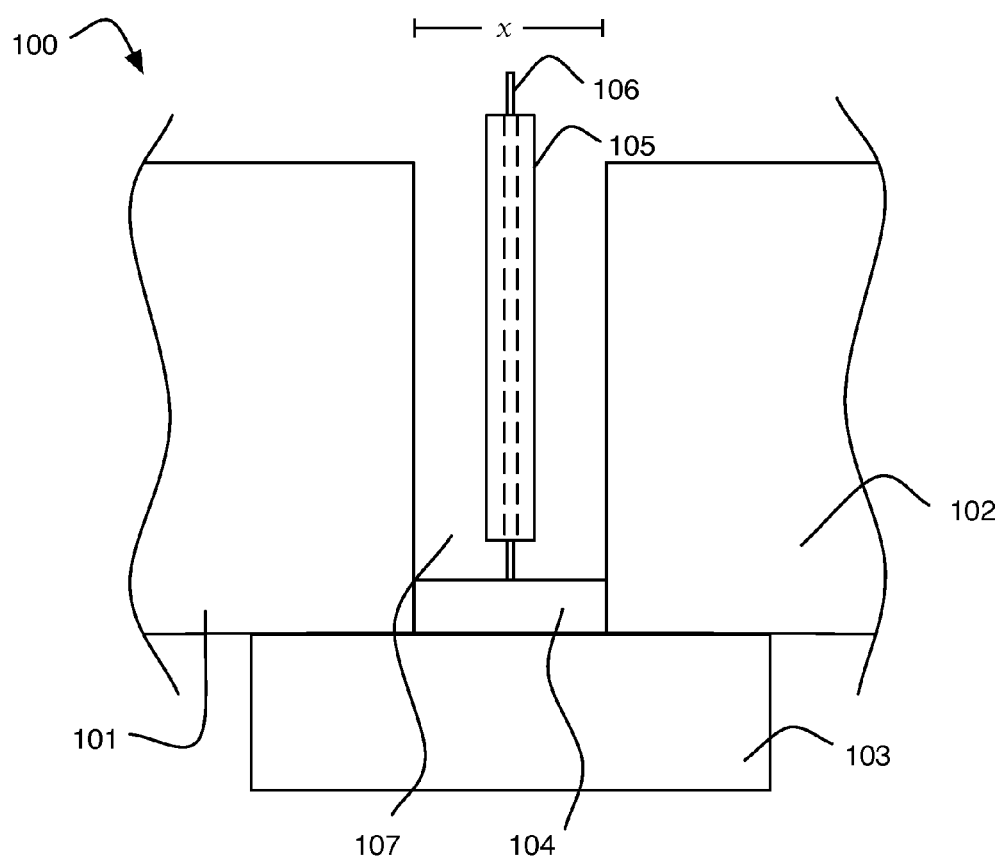
FIG. 1 is an illustration of a side-view cross section of an example apparatus for forming electroslag welds.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, systems and computer readable media related to electroslag welding.

Electroslag welding may provide a relatively simple single pass welding technique. In some instances, the implementation of electroslag welding to field applications may be limited because the completed weld may not meet quality criteria. Examples discussed herein may offer the advantages of bringing high quality to field implemented electroslag welds.

In some examples, an electroslag welding method may include setting up for a weld by providing two work pieces set apart from one another such that weld surfaces of each work piece face each other. A base member and two side members may be provided around the gap between the work pieces to form a void that may define a weld region or volume between the work pieces. A wire guide having electrode openings may be placed in the void, and electrodes may be provided in the wire guide openings. The electrodes may be positioned such that at least one electrode's tip is adjacent to the base member. A flux material may be placed in the void and on the base member. An electrical current may be passed through electrodes, at least one of which may cause an arcing and heating. At least a portion of the flux material may melt to form a slag pool. The electrical current may be continued to be provided to heat the slag pool. The electrode or electrodes may be fed into the slag pool and the wire guide may be consumed into the slag pool. As the slag pool traverses the void, the slag pool may melt a portion of the work pieces to combine with the melted electrode or electrodes and wire guide to form a weld pool, which may be covered by the slag pool. The weld pool may cool and form a weld between the work pieces, and the process may be continued to form a weld throughout the void.

As discussed, electrodes may be fed into a slag pool and/or weld pool and electrical energy may be provided to the electrodes. As discussed herein, one or more weld parameters, such as electrode feed rates, electrode voltage levels or electrode current levels may be alternated between a high level and a low level during the weld. The alternation or oscillation of the weld parameter or parameters may provide welds with increased toughness and/or hardness. In some examples, the alternation may move the weld center over time or provide a diversity in the weld solidification pattern, such that one weld center throughout the weld may not form.

In an embodiment, the feed rate of one or more of the electrodes may be alternated between a faster feed rate and a slower feed rate over time. In some examples, the feed rates of two electrodes may be alternated and the alternation may be substantially phase shifted such that one electrode is at the faster feed rate while the other electrode is at the slower feed rate, and vice versa.

In another embodiment, the electrical energy provided to one or more of the electrodes may be alternated between a higher level and a lower level over time. In some examples, the voltage may be alternated between a higher level and a lower level. In other examples, the electrical current may be alternated between the higher level and the lower level. In some examples, the voltage or electrical current of two electrodes may be alternated and the alternation may be substantially phase shifted such that one electrode is at the higher voltage or electrical current while the other electrode is at the lower voltage or electrical current, and vice versa.

Such electroslag weld techniques may offer advantages such as field applicability, little or no consumption of work pieces during the weld, relatively rapid welding, minimal operator involvement, flexibility of weld materials and quality welds that meet testing and application requirements for hardness and toughness.

Figure 2:
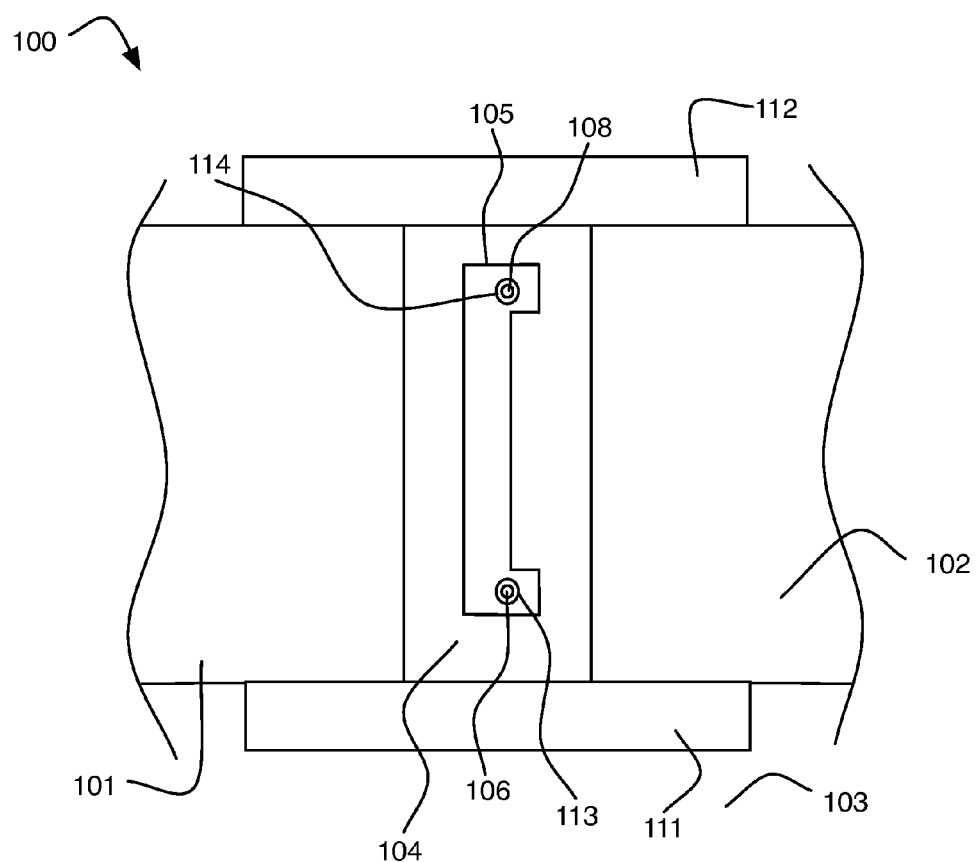
FIG. 2 is an illustration of a top-down cross section of an example apparatus for forming electroslag welds.

Turning now to the Figures, various embodiments are described. FIG. 1 and FIG. 2 are illustrations of a side-view cross section and a top-down cross section view, respectively, of a sample weld apparatus 100. Apparatus 100 may include a work piece 101 and a work piece 102, which may be welded together using the methods discussed herein. Apparatus 100 may also include a base member 103, a side member 111, and a side member 112. Work pieces 101, 102 may be arranged such that surfaces of the work pieces may be spaced apart from each other by a distance x. Work pieces 101, 102 may be placed upon base member 103, and side members 111, 112 and may be arranged to form a void 107 that may define a weld region or volume.

Apparatus 100 may also include a wire guide 105 having openings 113, 114, an electrode 106, an electrode 108, and flux 104. In general, an electrical circuit may be formed such that electrical resistance heating may be provided to the weld. In some examples, the electrodes may provide a terminal or series of terminals for the circuit and the base member or one of the work pieces may provide the other terminal for the circuit. The terminals may be connected to a power source that may provide electrical power to the weld.

Figure 3:
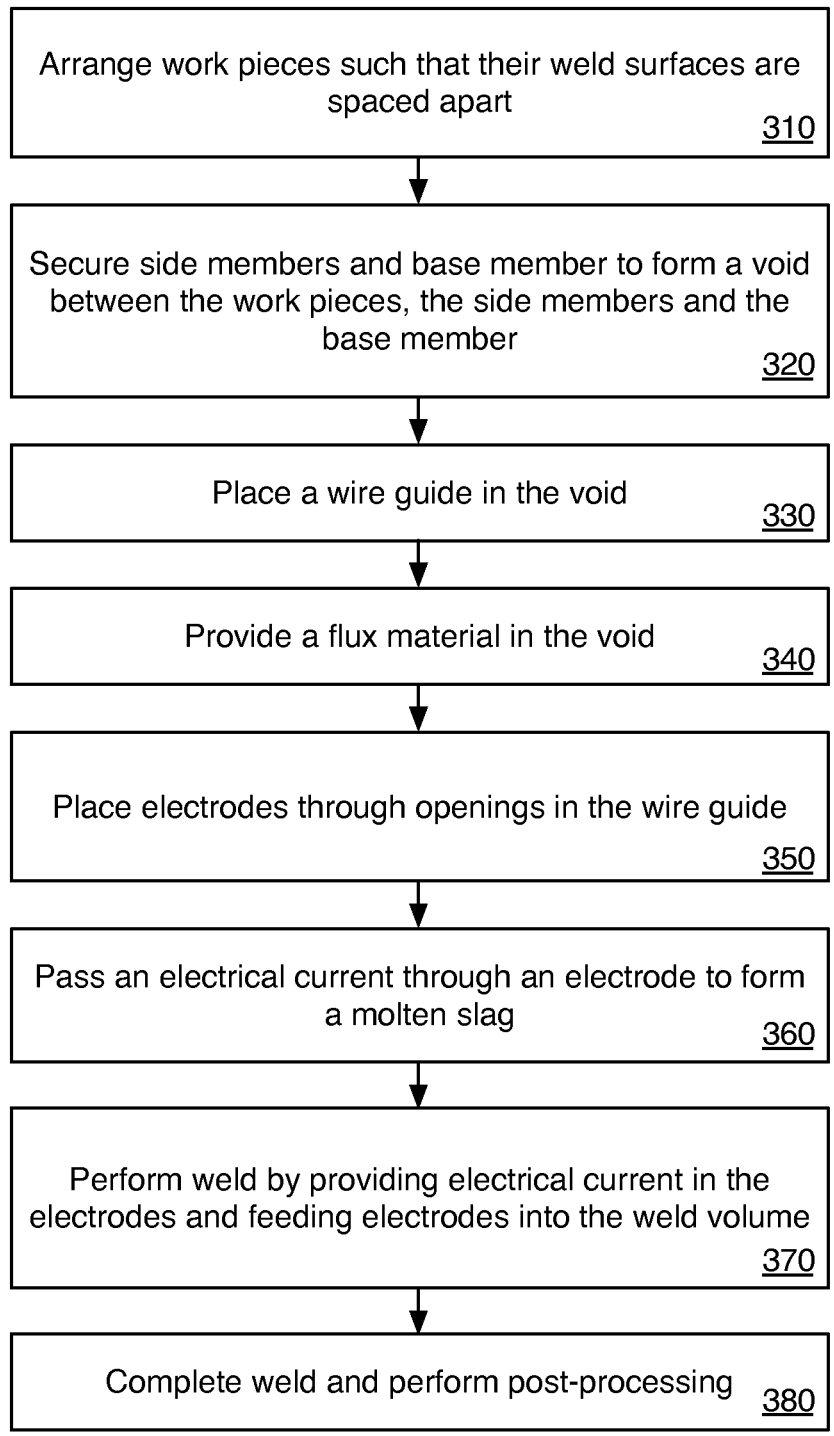
FIG. 3 is an illustration of a flow chart of an example method for producing electroslag welds.

FIG. 3 is an illustration of a flow chart of an example method 300 for producing an electroslag weld. Method 300 may include one or more functions, operations or actions as illustrated by one or more of blocks 310 through 380. In some examples, method 300 may be implemented under the control of a computer system, as is discussed further herein. Processing for method 300 may begin at block 310.

At block 310, work pieces 101, 102 may be arranged such that the surfaces to be welded may be spaced apart. At block 320, side members 111, 112 and base member 103 may be secured to form void 107 between work pieces 101, 102, side members 111, 112 and base member 103. At block 330, wire guide 105 may be placed in the void. At block 340, flux 104 may be provided in the void. At block 350, electrodes 106, 108 may be placed through openings in the wire guide. In some examples, at least some of the components may be commercially obtained or produced. In some examples, the components may be arranged and secured as shown in FIGS. 1 and 2 and as discussed herein. In some examples, pre-processing and/or set-up steps may be performed, such as clearing the weld region, cleaning the weld surfaces, component preheating or the like. In some examples, the components may be clamped into place and/or supported by a variety of equipment, which is not shown for the sake of clarity of presentation.

At block 360, the weld may be initiated by providing an electrical current in at least one electrode. The provided current may cause an arc between the electrode and base member 103. In some examples, electrical current may be provided to both electrodes and the electrodes may be substantially equally spaced from base member 103, and both may arc substantially simultaneously. In some examples, electrical current may be provided to both electrodes and the electrodes may be differently spaced from base member 103, and the electrodes may arc sequentially. In general, any suitable starting voltage may be used. In some examples the starting voltage may be in the range of about 20 to 100 volts. The provided current may heat, by electrical resistance, the electrode, base member 103 and flux 104. The arc and/or heat may cause at least some of the flux to melt and may thereby form a slag pool. In some examples, any arcing may be extinguished by the formed slag pool.

At block 370, the weld may continue with electrical current being provided to electrodes 106, 108 and electrodes 106, 108 being fed into the slag pool and/or a forming weld pool. In some examples, the voltage provided for resistive electrical heating may be held relatively constant. In some examples, the voltage may be varied. In some examples, the resistance of the slag pool and/or weld pool (which may relate to slag pool and/or weld pool depth) may be monitored and the voltage may be varied to maintain a substantially constant electrical resistance. As is discussed further herein, in some examples, the voltage or electrical current of the electrodes may be alternated or oscillated during the weld procedure.

Figure 4:
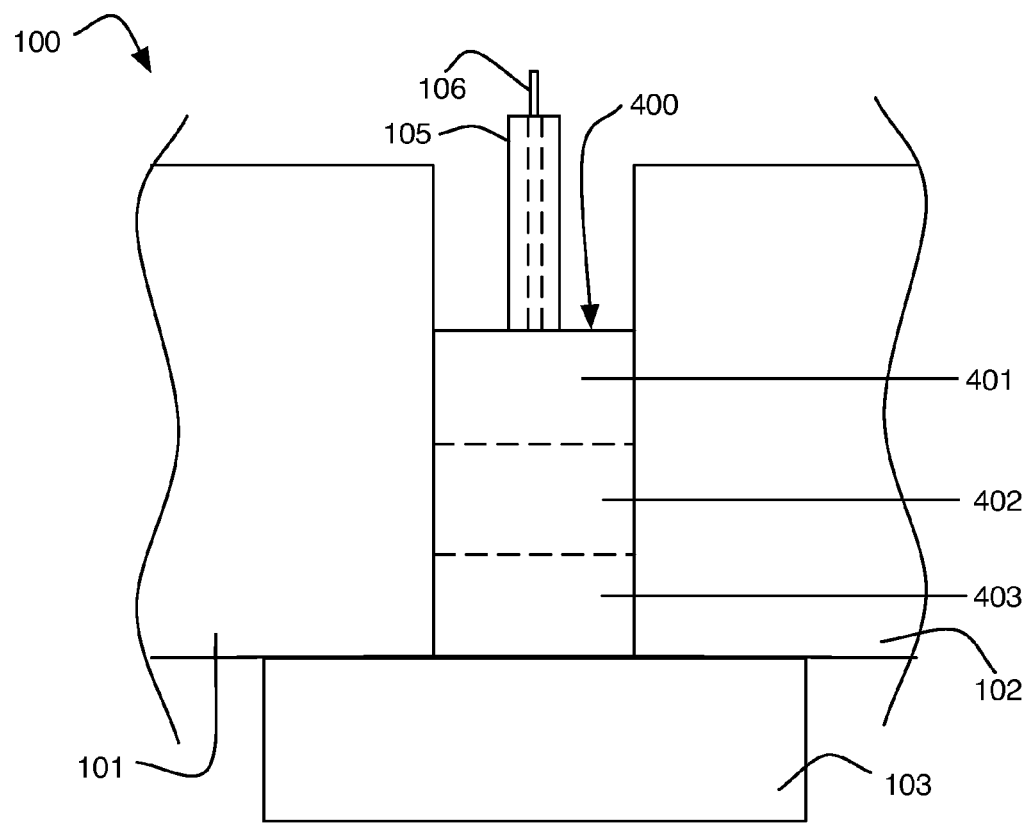
FIG. 4 is an illustration of a side-view cross section of an example apparatus during an electroslag weld process.

The electrical energy may heat the progressing slag pool and/or weld pool, which may consume portions of electrodes 106, 108 and wire guide 105, as shown in FIG. 4. FIG. 4 illustrates a cross section of apparatus 100 during a weld process. As shown in FIG. 4, a pool 400 may include a molten slag zone 401, a molten metal zone 402 and a coalesced metal zone 403. In some examples, molten slag zone 401 may be characterized as a slag pool. In some examples, molten metal zone 402 may be characterized as a weld pool. As the weld progresses, the slag pool may rise as more material may be added to the slag pool and/or the weld pool, and the forming weld, and void 107 may be filled. Eventually, the void may be substantially filled and the weld may be cooled to form a finished weld of coalesced metal. In some examples, the molten slag may be flowed into a runoff volume, which is not shown for the sake of clarity of presentation.

At block 380, the weld may be completed and post processing may be performed. In some examples, after the weld has cooled, the side members, base member, and any reinforcement equipment may be removed by, for example, shearing, flame cutting, or abrasive grinding. In some examples, the completed weld may be treated or manipulated to remove excess material using similar techniques.

As discussed, the weld may progress as electrical current may be provided to electrodes 106, 108 and as electrodes 106, 108 may be fed into the forming slag pool and/or weld pool. In various embodiments, one or more weld parameters, such as electrode feed rates, electrode voltage levels or electrode current levels may be alternated between a high level and a low level during the weld.

Figure 5:
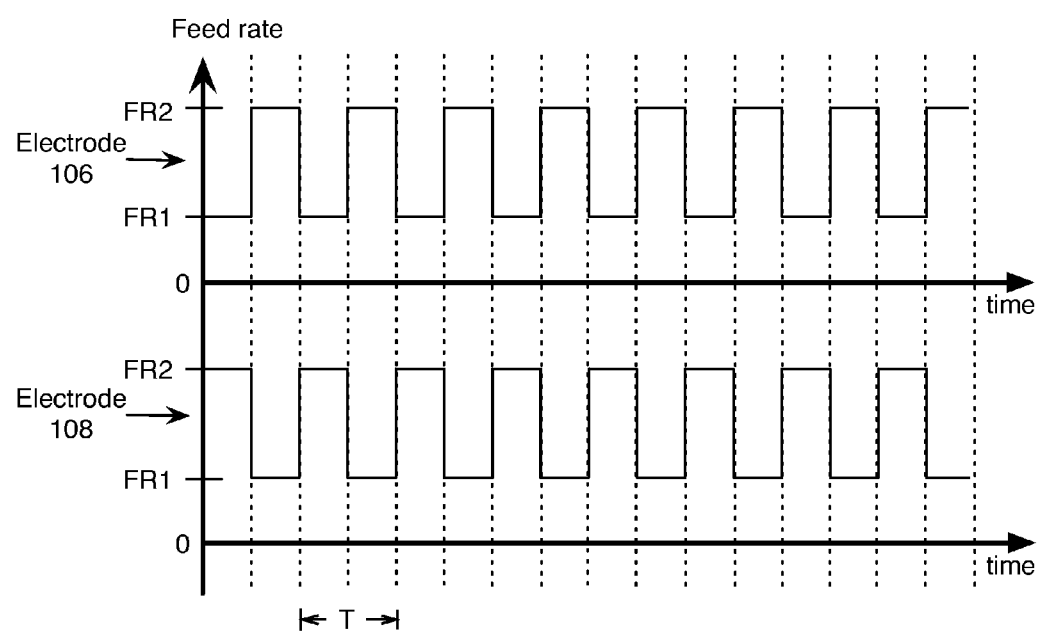
FIG. 5 is an illustration of an example chart of alternating electrode feed rates.

As illustrated in FIG. 5, in an embodiment, the feed rates of electrodes 106, 108 may be alternated between a faster feed rate, FR2, and a slower feed rate, FR1 over an alternation time period, T. In FIG. 5, advancing time is shown on the horizontal axis and the feed rates of electrode 106 and 108 are shown split out vertically to aid in clarity of presentation. It is noted that two origin points are illustrated on the vertical axis. As discussed, alternating the electrode feed rates may move the weld center over time or provide a diversity in the weld solidification pattern, which may increase the toughness of the weld.

As shown in FIG. 5, in some examples, the faster feed rates and the slower feed rates of the electrodes may be substantially the same. In other examples, the faster feed rates may be different. In some examples, the slower feed rates may be different. In other examples, both the faster feed rates and the slower feed rates of the electrodes may be different. Also as shown in FIG. 5, in some examples, the time period for the completion of an alternation cycle, T, may be substantially the same for both electrodes. In other examples, the time periods for completion of an alternation cycle may be different between the electrodes. In some examples, the time period for the completion of the alternation cycle, T, may be in the range of about 5 to 30 seconds. In some examples, the time period for the completion of the alternation cycle, T, may be in the range of about 30 to 60 seconds. In some examples, the alternation cycle time may be varied over time.

As shown in FIG. 5, in some examples, the alternation of the electrodes may be substantially phase shifted such that electrode 106 may be at the faster feed rate while electrode 108 may be at the slower feed rate and such that electrode 106 may be at the slower feed rate while electrode 108 may be at the faster feed rate. In other examples, the alternation of the electrodes may be in phase such that electrodes 106, 108 may be at the faster feed rate and the slower feed rate substantially simultaneously. In other examples, the alternation of the electrodes may be out of phase such that the electrode rates drift with respect to each other over time. In some examples, the electrode rates may have a phase difference addressed in degrees (such that 0 degrees is in phase and 180 degrees is in anti-phase). In some examples, the electrode rates may have a phase difference in the range of about 30 to 90 degrees. In some examples, the electrode rates may have a phase difference in the range of about 90 to 120 degrees.

As discussed, the electrode feed rates may be alternated between faster and slower feed rates. In general, the feed rates may be any suitable feed rates that may provide electrode material to the weld zone to complete a successful weld. In some examples, the faster feed rate may be in the range of about 200 to 250 inches per minute. In some examples, the faster feed rate may be in the range of about 250 to 400 inches per minute. In some examples, the faster feed rate may be in the range of about 400 to 500 inches per minute. In some examples, the slower feed rate may be in the range of about 120 to 170 inches per minute. In some examples, the slower feed rate may be in the range of about 50 to 120 inches per minute. In some examples, the slower feed rate may be in the range of about 120 to 200 inches per minute.

In another embodiment, the electrical energy provided to the electrodes may be alternated between a higher level and a lower level over time. In some examples, the voltage supplied to electrodes 106, 108 may be alternated between a higher level and a lower level over an alternation period, similar to the feed rate alternation described above. In other examples, the electrical current supplied to electrodes 106, 108 may be alternated between a higher level and a lower level over an alternation period.

Figure 6:
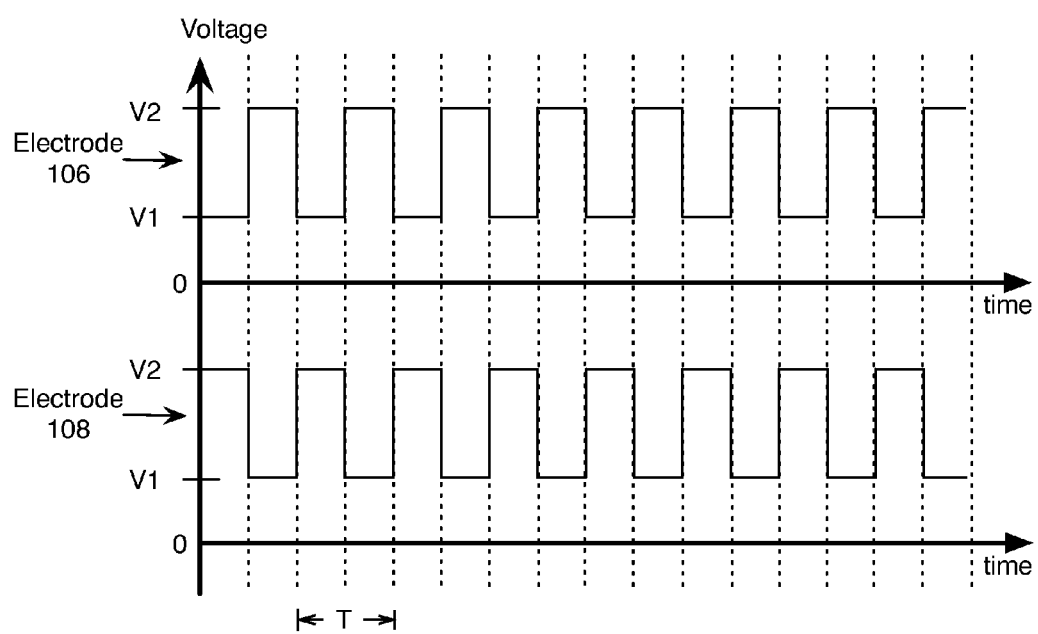
FIG. 6 is an illustration of an example chart of alternating electrode voltage levels.

As illustrated in FIG. 6, the voltage supplied to electrodes 106, 108 may be alternated between a higher voltage level, V2, and a lower voltage level, V1, over an alternation time period, T. In FIG. 6, advancing time is shown on the horizontal axis and the voltages supplied to electrode 106 and 108 are shown split out vertically to aid in clarity of presentation. It is noted that two origin points are illustrated on the vertical axis.

As shown in FIG. 6, in some examples, the higher voltage level and the lower voltage level of the electrodes may be substantially the same. In other examples, the higher voltage levels may be different. In some examples, the lower voltage levels may be different. In other examples, both the higher and lower voltage levels of the electrodes may be different. Also as shown in FIG. 6, in some examples, the time period for the completion of an alternation cycle, T, may be substantially the same for both electrodes. In other examples, the time periods for completion of an alternation cycle may be different between the electrodes. In some examples, the time period for the completion of the alternation cycle, T, may be in the range of about 5 to 30 seconds. In some examples, the time period for the completion of the alternation cycle, T, may be in the range of about 30 to 60 seconds. In some examples, the alternation cycle time may be varied over time.

As shown in FIG. 6, in some examples, the alternation of the electrode voltage levels may be substantially phase shifted such that electrode 106 may be at the higher voltage level while electrode 108 may be at the lower voltage level and such that electrode 106 may be at the lower voltage level while electrode 108 may be at the higher voltage level. In other examples, the alternation of the electrodes may be in phase such that electrodes 106, 108 may be at the higher voltage level and the lower voltage level substantially simultaneously. In other examples, the alternation of the electrode voltage levels may be out of phase such that the electrode rates drift with respect to each other over time. In some examples, the electrode voltage levels may have a phase difference addressed in degrees (such that 0 degrees is in phase and 180 degrees is in anti-phase). In some examples, the electrode voltage levels may have a phase difference in the range of about 30 to 90 degrees. In some examples, the electrode voltage levels may have a phase difference in the range of about 90 to 120 degrees.

As discussed, the electrode voltage levels may be alternated between higher and lower voltage levels. In general, the voltage levels may be any suitable voltage levels that may provide sufficient energy to the weld zone to complete a successful weld. In some examples, the higher voltage level may be in the range of about 40 to 50 volts. In some examples, the higher voltage level may be in the range of about 30 to 40 volts. In some examples, the higher voltage level may be in the range of about 15 to 30 volts. In some examples, the lower voltage level may be in the range of about 0 to 5 volts. In some examples, the lower voltage level may be in the range of about 5 to 10 volts. In some examples, the lower voltage level may be in the range of about 10 to 25 volts.

Figure 7:
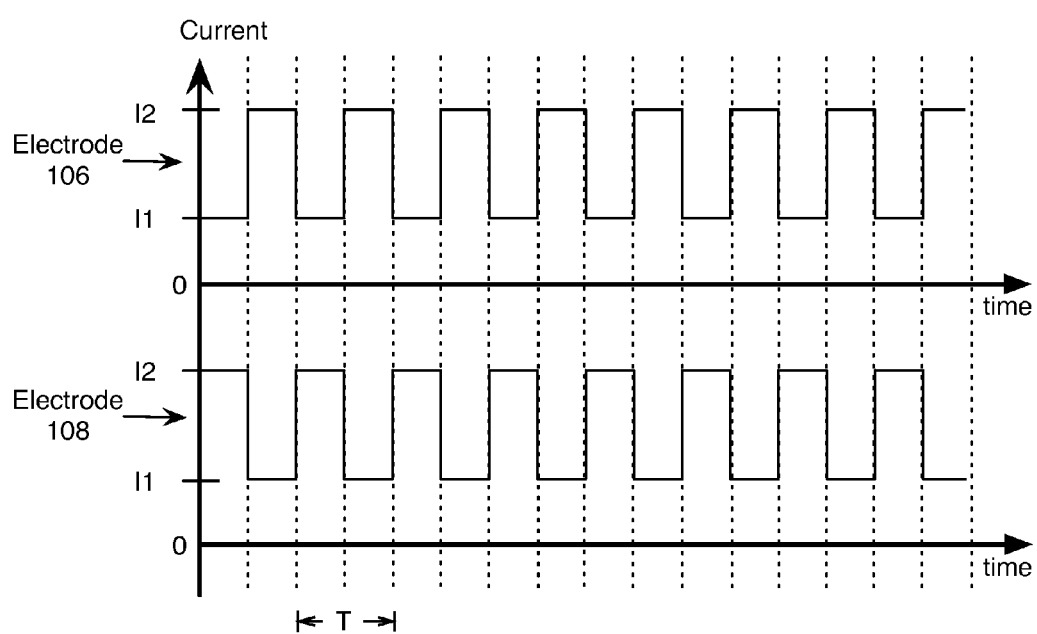
FIG. 7 is an illustration of an example chart of alternating electrode current levels.

As illustrated in FIG. 7, the electrical current supplied to electrodes 106, 108 may be alternated between a higher electrical current level, I2, and a lower electrical current level, I1, over an alternation time period, T. In FIG. 7, advancing time is shown on the horizontal axis and the electrical currents supplied to electrode 106 and 108 are shown split out vertically to aid in clarity of presentation. It is noted that two origin points are illustrated on the vertical axis.

As shown in FIG. 7, in some examples, the higher electrical current level and the lower electrical current level of the electrodes may be substantially the same. In other examples, the higher electrical current levels may be different. In some examples, the lower electrical current levels may be different. In other examples, both the higher and lower electrical current levels of the electrodes may be different. Also as shown in FIG. 7, in some examples, the time period for the completion of an alternation cycle, T, may be substantially the same for both electrodes. In other examples, the time periods for completion of an alternation cycle may be different between the electrodes. In some examples, the time period for the completion of the alternation cycle, T, may be in the range of about 5 to 30 seconds. In some examples, the time period for the completion of the alternation cycle, T, may be in the range of about 30 to 60 seconds. In some examples, the alternation cycle time may be varied over time.

As shown in FIG. 7, in some examples, the alternation of the electrode electrical current levels may be substantially phase shifted such that electrode 106 may be at the higher electrical current level while electrode 108 may be at the lower electrical current level and such that electrode 106 may be at the lower electrical current level while electrode 108 may be at the higher electrical current level. In other examples, the alternation of the electrodes may be in phase such that electrodes 106, 108 may be at the higher electrical current level and the lower electrical current level substantially simultaneously. In other examples, the alternation of the electrode electrical current levels may be out of phase such that the electrode rates drift with respect to each other over time. In some examples, the electrode electrical current levels may have a phase difference addressed in degrees (such that 0 degrees is in phase and 180 degrees is in anti-phase). In some examples, the electrode electrical current levels may have a phase difference in the range of about 30 to 90 degrees. In some examples, the electrode electrical current levels may have a phase difference in the range of about 90 to 120 degrees.

As discussed, the electrode current levels may be alternated between higher and lower current levels. In general, the electrical current levels may be any suitable electrical current levels that may provide sufficient energy to the weld zone to complete a successful weld. In some examples, the higher electrical current level may be in the range of about 700 to 900 amps. In some examples, the higher electrical current level may be in the range of about 900 to 1500 amps. In some examples, the higher electrical current level may be in the range of about 1500 to 2000 amps. In some examples, the lower electrical current level may be in the range of about 0 to 400 amps. In some examples, the lower electrical current level may be in the range of about 400 to 600 amps. In some examples, the lower electrical current level may be in the range of about 600 to 800 amps.

In some examples, the electrical energy provided to the weld may be provided as a direct current. In other examples, the electrical power may be provided as an alternating current. As will be appreciated, the alternation cycle times for the voltage levels discussed with respect to FIGS. 6 and 7 may be substantially longer in duration than the alternating current cycle time (about $\frac{1}{60}$ of a second in some examples) over which alternating current may typically be provided. Over the alternating cycle time durations discussed herein, alternating current may be considered a substantially constant power source.

As shown in FIG. 1, apparatus 100 may include work pieces 101, 102. In general, work pieces 101, 102 may be any suitable work pieces of any suitable material or materials that may be welded using the methods discussed herein. In various examples, work pieces 101, 102 may be plates, girders, bridge components or rail members, or the like. In some examples, the work pieces may be symmetric components. In other examples, they may be non-symmetric components. In some examples, work pieces 101, 102 may have substantially the same cross sectional shapes. In other examples, work pieces 101, 102 may have different cross sectional shapes. In some examples, work pieces 101, 102 may include steel, low carbon steel, steel alloys, or high carbon steel. In some examples, work pieces 101, 102 may include titanium. In some examples, work pieces 101, 102 may include aluminum. In some examples, work pieces 101, 102 may be substantially the same material. In other examples, they may be different materials. As shown in FIG. 1, work pieces 101, 102 may be separated by a distance of x for the weld. In general, work pieces 101, 102 may be separated by any suitable distance. In some examples, work pieces 101, 102 may be separated by a distance in the range of about a half of an inch to about one and a half inches.

Apparatus 100 may also include base member 103. In general, base member 103 may include any suitable shape and/or material that may contain the molten slag and weld metal until the weld may be complete. In some examples, base member 103 may act as a sump in which the weld is initiated and may contain and concentrate heat. In some examples, base member 103 may provide a conductive path for the electrical welding energy to pass from the electrodes through to ground. In some examples, base member 103 may be grounded by a ground lead or grounding strap. In some examples, base member 103 may provide a current path for the weld start and therefore base member 103 may be considered a start block. In some examples, base member 103 may be reusable. In some examples, a consumable component may be placed on base member 103 and after the weld completion, the consumable component may remain as a portion of the weld and base member 103 may be removed. In some examples, the consumable component may include a metallic insert.

Apparatus 100 may also include flux 104. In general, any suitable material and/or amount of flux 104 may be used to provide a slag pool to complete a weld. In some examples, prior to the weld, the weld volume may be charged with flux 104 that may be placed on base member 103. In some examples, a charge of about 50 to 500 grams of flux may be used. In some examples, flux may be added as the weld progresses. In some examples, flux may be added during the weld at a rate of between about 30 to 80 grams of flux per minute.

As shown in FIG. 2, apparatus 100 may also include side members 111, 112. In general, side members 111, 112 may include any suitable shape and/or material that may contain the molten slag and weld material until the weld may be complete. In some examples, side members 111, 112 may include copper. In some examples, side members 111, 112 may be cooled by water, a heat transfer fluid, or air cooled. In some examples, side members 111, 112 may be constructed such that heat may be selectively removed throughout the weld volume such that weld properties may be optimized. In examples where the work pieces are rail members, preferential cooling adjacent the rail head may producing higher hardness on the rail running surface. Further, in such rail member examples, heat may be retained in the rail web and/or base such that toughness may be improved in those regions. In some examples, side members 111, 112 may remove heat after completion of the weld such that quicker cooling rates may be achieved.

Apparatus 100 may also include wire guide 105 that may have openings 113, 114. In general, wire guide 105 may include any shape and/or materials that may provide for guiding electrodes 106, 108 to the weld zone and may provide a suitable material for a proper weld. As shown in FIG. 2, in some examples, wire guide 105 may include openings 113, 114 for electrodes 105, 106. In some examples, wire guide 105 may include a narrow portion between two thicker portions that include openings 113, 114. In some examples, the thinner portion may have a thickness in the range of about $\frac{1}{32}$ of an inch to about $\frac{1}{8}$ of an inch. In various examples, the thicker portion may have a thickness in the range of about $\frac{1}{8}$ of an inch to about $\frac{1}{2}$ of an inch. In general, as shown in FIG. 1, wire guide 105 may substantially extend from a top of the weld region to adjacent to base member 103. In some examples, wire guide 105 may be generally planar. In some examples, wire guide 105 may include steel. In some examples, wire guide 105 may be shaped generally like the cross-sectional shape of work pieces 101, 102. In various examples, wire guide 105 may include 1004, 1040, 4340, 1080, or 1095 steel.

Apparatus may also include electrodes 106, 108. In general, electrodes 106, 108 may include any material or materials that may provide for the arcing and electrical heating of an electroslag weld and may provide a suitable weld forming material as discussed. In various examples, an electrode may include nickel, molybdenum, chromium, manganese, silicon, iron, aluminum, titanium or vanadium. In some examples, the electrodes may include about 2.5 to 99% nickel, about 0.04 to 0.8% carbon, about 1% Mn, about 1% Si, and the balance Fe.

In some examples, electrodes 106, 108 may have substantially the same compositions. In other examples, electrodes 106, 108 may have different compositions. In some examples, an electrode may have substantially the same composition throughout the electrode. In other examples, the electrode composition may differ such that, as the electrode may be fed into the welding zone, different materials may be included in the weld. Such differing weld compositions may offer advantageous characteristics at different points in the weld. For example, in rail applications, increased hardness may be desired at the rail head while increased toughness may be desired at the rail base.

As discussed herein, two electrodes may be provided for the electroslag weld. In other examples, three or more electrodes may be provided. In general, any suitable number of electrodes may be used. The electrodes may be provided using the alternating feed rates as discussed herein or they may be fed at constant feed rates. As will be appreciated, as the number of electrodes increases, a wide range of feed rates, alternation durations, alternation patterns and the like may be available. In some example, a third electrode may be provided and fed into the weld zone at a substantially constant feed rate over time. In some examples, wire guide 105 may include additional openings for any additional electrodes.

As discussed, in various embodiments, electroslag weld parameters may be alternated or oscillated. In some examples, electrode feed rates may be alternated. In other examples, electrical power (by voltage or current) may be oscillated. In some examples, some parameters may be held substantially constant while another parameter may be alternated. In some examples, voltage may be held substantially constant while electrode feed rates may be alternated. In other examples, feed rates may be held constant while voltage or electrical current may be alternated. In other examples, multiple parameters may be alternated simultaneously. In some examples, electrode feed rates and electrical energy (voltage or current) may be alternated substantially simultaneously using any of the techniques discussed herein.

Figure 8:
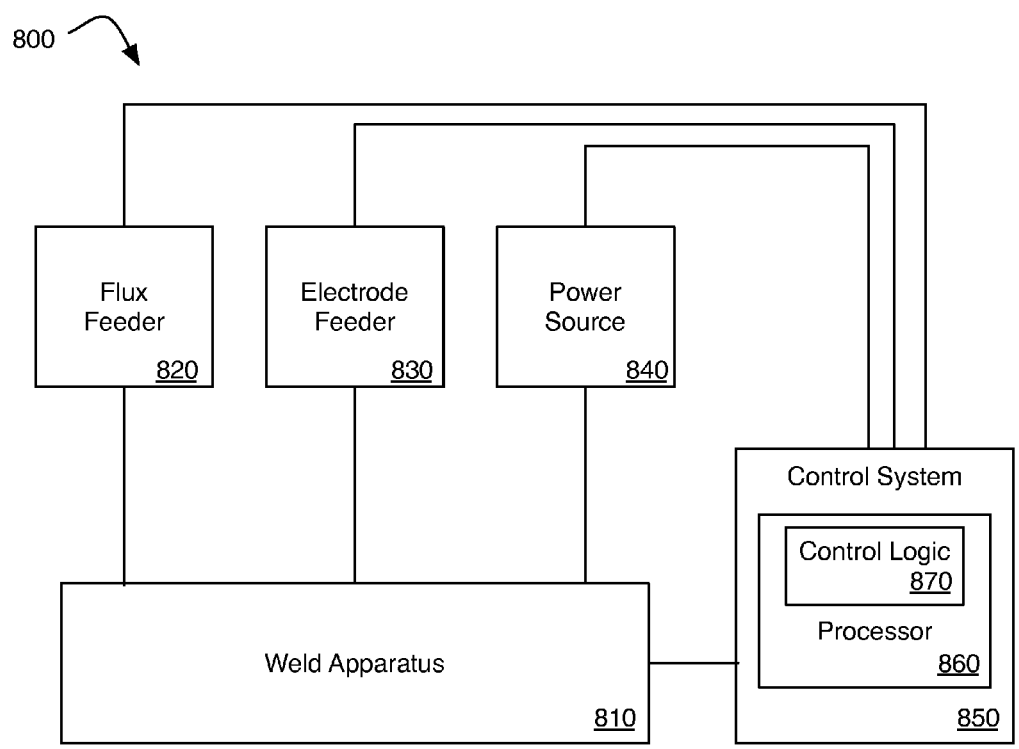
FIG. 8 is an illustration of an example system for producing electroslag welds.

Turning now to other embodiments that may perform any of the methods as described herein, FIG. 8 illustrates an example system 800 for electroslag welding arranged in accordance with at least some embodiments of the present disclosure. System 800 may be used to perform some or all of the functions described herein. System 800 may include a weld apparatus 810, a flux feeder 820, an electrode feeder 830 and a power source 840 operably coupled to a control system 850 that may include a processor 860 having process unit control logic 870. Weld apparatus 810 may include any or all of the characteristics and/or equipment as described herein with respect to apparatus 100. In various examples, weld apparatus 810 may include a first side member, a second side member and a base member configured to form a void with a first work piece and a second work piece that defines a weld region. System 800 may also include other equipment such as, for example, run off collectors, electrical probes, pumps for running cooling fluid to side members, temperature probes, or the like. System 800 may also include electromechanical devices or robotic equipment that may be configured to actuate or arrange the various components.

As illustrated schematically in FIG. 8, flux feeder 820 may be coupled to weld apparatus 810 such that flux may be fed from the feeder to the welding region or volume, electrode feeder 830 may be coupled to weld apparatus 810 such that any number of electrodes may be fed into the welding region or volume, and power source 840 may be coupled to weld apparatus 810 such that electrical power may be provided to the weld apparatus and/or equipment.

In some examples, system 800 may include a processor 860. In some examples, processor 860 may be implemented as part of a computer system. System 800 may include process unit control logic 860 that may be configured to undertake various methods, functional operations, actions, or blocks such as those described herein. Further, control system 850 may include additional items such as memory, a router, network interface logic, etc. Control logic 870 may be configured to provide any of the functionality described herein and claimed subject matter is not limited to specific types or manifestations of processing logic. Processor 860 and control system 850 may communicate by any suitable technique or techniques.

Figure 9:
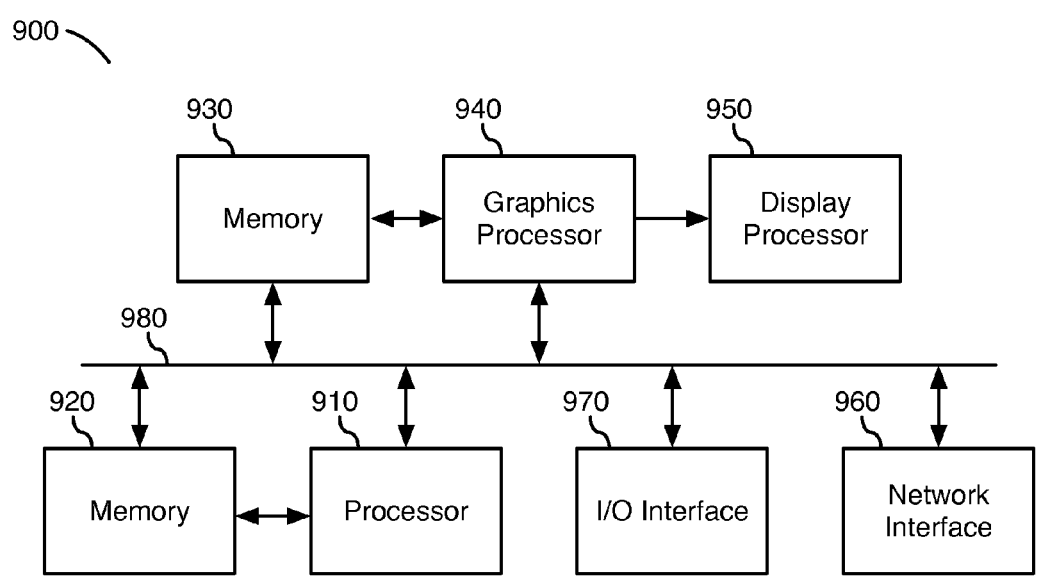
FIG. 9 is a block diagram illustrating an example computing device; all arranged in accordance with at least some embodiments of the present disclosure.

FIG. 9 illustrates a computer system 900, which may carry out the techniques discussed herein. In some examples, computer system 900 may utilize a computer program product or local memory, which may include one or more machine-readable instructions which, when executed, may operatively enable a computing device to provide the functionality described herein. In various examples, some or all of the machine-readable instructions may be used by the devices discussed with respect to FIGS. 8 and 9.

Computer system 900 may include a processor 910, a memory 920, a memory 930, a graphics processor 940, a display processor 950, a network interface 960, an I/O interface 970, and a communication bus 980. In an example, the control system discussed with respect to FIG. 8 may be provided as a part of computer system 900. In various examples, processor 910 may be of any type including but not limited to a microprocessor, a microcontroller, a digital signal processor, or the like. In some examples, processor 910 may include one or more levels of caching. In various examples, memory 920, 930 may be of any type including but not limited to volatile memory, non-volatile memory, or the like. Computer system 900 may have additional features or functionality, and additional interfaces to facilitate communications with other devices. For example, communication bus 980 may be used to facilitate communications between the various functional components.

Computer system may include I/O interface 970 for providing an interface to external components, such as, for example, a keyboard, a mouse, a monitor, external memory or other external devices. Computer system 900 may also include a network interface 960 for facilitating communication with other devices. Computer system may include graphics processor 940 and display processor 950 for configuring data for display to a monitor or other display device. Computer system may be implemented as any suitable form factor device such as, for example, a desktop computer, a laptop computer, or a mobile computing device.

Reference throughout this specification to "one embodiment" or "an embodiment" means that a particular feature, structure, material, or characteristic described in connection with the embodiment is included in at least one embodiment of the invention. Thus, the appearances of the phrases "in one embodiment" or "in an embodiment" in various places throughout this specification are not necessarily referring to the same embodiment of the invention. Furthermore, the particular features, structures, materials, or characteristics may be combined in any suitable manner in one or more embodiments.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed:

1. A method for electroslag welding a first work piece and a second work piece comprising:
arranging a first surface of the first work piece spaced apart from a second surface of the second work piece;
securing a first side member, a second side member and a base member adjacent to the first surface and the second surface to form a void between the first work piece, the second work piece, the first side member, the second side member and the base member;
placing a wire guide in the void;
providing a flux material in the void and adjacent to the wire guide;
placing a first electrode through a first opening in the wire guide;
placing a second electrode through a second opening in the wire guide;
passing an electrical current through the first electrode to form a molten slag from at least a portion of the flux material;
feeding the first electrode into the molten slag at a first feed rate;
feeding the first electrode into the molten slag at a second feed rate;
corresponding to the feeding of the first electrode at the first feed rate, feeding the second electrode into the molten slag at a feed rate equivalent to the second feed rate; and
corresponding to the feeding of the first electrode at the second feed rate, feeding the second electrode into the molten slag at a feed rate equivalent to the first feed rate, wherein the feed rates of the first electrode and the feed rates of the second electrode alternate with respect to each other over time facilitating an alternating pattern of feeding the first electrode and the second electrode.

2. The method of claim 1, wherein the first electrode and the second electrode alternate in a phase shifted manner such that the first electrode is at the first feed rate while the second electrode is at an offset of the second feed rate.

3. The method of claim 1, further comprising:
passing a third electrode through a third opening in the wire guide; and
feeding the third electrode at substantially constant feed rate over time.

4. The method of claim 1, wherein the first feed rate is in the range of about 200 to 250 inches per minute and the second feed rate is in the range of about 120 to 170 inches per minute.

5. The method of claim 1, wherein the wire guide comprises a narrow portion between a first thicker portion and a second thicker portion, and wherein the first thicker portion includes the first opening and the second thicker portion includes the second opening.

6. A method for electroslag welding a first work piece and a second work piece comprising:
arranging a first surface of the first work piece spaced apart from a second surface of the second work piece;
securing a first side member, a second side member and a base member adjacent to the first surface and the second surface to form a void between the first work piece, the second work piece, the first side member, the second side member and the base member;
placing a wire guide in the void;
providing a flux material in the void and adjacent to the wire guide;
placing a first electrode through a first opening in the wire guide;
placing a second electrode through a second opening in the wire guide;
passing an electrical current through the first electrode to form a molten slag from at least a portion of the flux material;
feeding the first electrode at a first feed rate;
feeding the first electrode at a second feed rate, the second feed rate being slower than the first feed rate,
alternating the feeding of the first electrode between the first feed rate and the second feed rate; and
corresponding to the feeding of the first electrode, feeding the second electrode such that a feed rate of the second electrode alternates between the first feed rate and the second feed rate over time, and wherein the feed rates of first electrode and feed rates of the second electrode alternate phase shifted with respect to each other such that the first electrode is at the first feed rate while the second electrode is at the second feed rate and such that the first electrode is at the second feed rate while the second electrode is at the first feed rate facilitating an alternating pattern of feeding the first electrode and the second electrode.

7. The method of claim 6, wherein the first work piece comprises at least one of a plate, a girder, a bridge component or a rail member.

8. The method of claim 6, wherein the first side member comprises water cooling.

9. The method of claim 6, wherein the first electrode comprises at least one of nickel, carbon, molybdenum, chromium, manganese, silicon, iron, aluminum, titanium or vanadium.

10. The method of claim 6, wherein a composition of the first electrode varies over a length of the first electrode such that a weld composition is varied across a length of the weld.

11. The method of claim 6, wherein a composition of the first electrode is different than a composition of the second electrode.

12. The method of claim 6, wherein the wire guide comprises a narrow portion between a first thicker portion and a second thicker portion, and wherein the first thicker portion includes the first opening and the second thicker portion includes the second opening.

* * * * *